United States Patent [19]

Watson et al.

[11] Patent Number: 4,809,558
[45] Date of Patent: Mar. 7, 1989

[54] METHOD AND APPARATUS FOR USE WITH VORTEX FLOWMETERS

[75] Inventors: Christopher A. Watson, Upland; Howard G. Fox, West Covina; Tuyen Q. Nguyen, Cypress, all of Calif.

[73] Assignee: ITT Corporation, New York, N.Y.

[21] Appl. No.: 19,444

[22] Filed: Feb. 27, 1987

[51] Int. Cl.$^4$ .............................................. G01F 1/32
[52] U.S. Cl. ................................................ 73/861.22
[58] Field of Search ............ 73/861.21, 861.22, 861.24

[56] References Cited

U.S. PATENT DOCUMENTS

| | | | |
|---|---|---|---|
| 3,948,098 | 4/1976 | Richardson et al. | 73/861.24 |
| 3,982,434 | 9/1976 | McMurtrie | 73/194 |
| 4,015,472 | 4/1977 | Herzl | 73/194 |
| 4,026,150 | 5/1977 | Schmidt | 73/194 |
| 4,084,155 | 4/1978 | Herzl et al. | 340/210 |
| 4,183,243 | 1/1980 | Patterson et al. | 73/155 |
| 4,270,391 | 8/1979 | Herzl | 73/861.22 |
| 4,375,768 | 3/1983 | Beck et al. | 78/861.22 |
| 4,457,166 | 4/1984 | Kobayashi | 73/118 |
| 4,463,612 | 8/1984 | Thompson | 73/861.22 |

FOREIGN PATENT DOCUMENTS

| | | | |
|---|---|---|---|
| 55-106314 | 8/1980 | Japan | 73/861.22 |
| 56-120917 | 9/1981 | Japan | 73/861.24 |
| 60-53811 | 3/1985 | Japan | 73/861.22 |
| 60-183523 | 9/1985 | Japan | 73/861.22 |
| 61-96414 | 5/1986 | Japan | 73/861.22 |

Primary Examiner—Stewart J. Levy
Assistant Examiner—Robert P. Bell
Attorney, Agent, or Firm—Menotti J. Lombardi

[57] ABSTRACT

A method and apparatus for increasing the resolution and accuracy of flow measurements made by vortex flowmeters. A signal conditioning circuit connected to a vortex sensor generates a vortex signal having a period that varies with the frequency of the vortex street. The period of this vortex signal is measured by a period sampling circuit, which generates a vortex period signal. When a programmable control circuit determines that the change in the frequency indicated by successive values of the vortex period signal is relatively small, the displayed flow value is based on the current frequency of the vortex signal; when the change in frequency indicated by successive values of the vortex period signal is relatively large, the displayed flow value is based on the running average frequency of the vortex signal.

19 Claims, 3 Drawing Sheets

METHOD AND APPARATUS FOR USE WITH VORTEX FLOWMETERS

FIELD OF THE INVENTION

The present invention relates to vortex flowmeters and is directed more particularly to a method and apparatus for improving the resolution and accuracy of flow measurements made by vortex flowmeters.

BACKGROUND OF THE INVENTION

In the art of fluid flow measurement, vortex or vortex shedding flowmeters have a number of advantages over alternative types of flowmeters such as turbine meters and differential pressure flowmeters. One of these advantages is the simplicity of the in-fluid portion of the flowmeter, which typically includes only a bluff body and a pressure fluctuation sensor. Another is the absence from those flowmeters which use solid-state pressure sensors, of moving parts such as turbine blades and their associated bearings. Together, these advantages are responsible for the widespread use of vortex flowmeters to measure the rate of flow and/or total flow of both liquids and gases.

Vortex flowmeters also, however, have a number of disadvantages which limit their usefulness. One of these disadvantages is the tendency of the sensor output signal to exhibit certain instabilities or unpredictable fluctuations. One such fluctuation, known as "fade," is characterized by a decrease in the magnitude of the sensor output signal that extends over a number of cycles. Another such fluctuation, often referred to as a "missing pulse," is characterized by the absence or near absence of one cycle of the sensor output signal in the midst of succession of normal or near normal cycles. Still another of such fluctuations, known as "jitter," is characterized by unpredictable transient changes in the period of the sensor output signal.

Prior to the present invention, a number of different circuits and methods have been devised in an attempt to deal with the above-described instabilities. Some of these, such as the circuit described in U.S. Pat. No. 4,270,391, attempt to eliminate these instabilities at the input side of the flowmeter by using a phase locked loop circuit. Others attempt to eliminate these instabilities at the output side of the meter by using sample and hold circuits. Still others attempt to eliminate these instabilities by means of circuits, intermediate the input and output sides of the flowmeter, which compensate for signal fluctuations as, for example, by generating pulses for insertion in place of missing pulses.

All known circuits of the above-described type, however, introduce the risk of causing inaccuracies in the flow that they are intended to measure. This is because they all have the effect of using data which is (at least in part) not derived from measured frequency values or of discarding data which is derived from measured frequency values. As a result, to the extent that fluctuations in the sensor output signal represent real fluctuations in the rate of flow, their elimination must be regarded as the introduction of a source of error.

SUMMARY OF THE INVENTION

In accordance with the present invention, there is provided an improved method and apparatus which reduces the effect of the instabilities in vortex sensor output signals while maintaining a close link between displayed flow values and measured frequency values.

Generally speaking, the present invention contemplates the preprocessing of the vortex signal so as to enhance the measurability of its period (or frequency, since specifying the period of a signal uniquely fixes its frequency), without distorting the duration of that period. The method of the invention also contemplates the generation of displayed flow values directly from measured frequency values so long as a frequency difference signal, indicative of the difference (absolute or percentage) between the frequencies of successive cycles of the vortex sensor, remains within reasonable limits, and the generation of displayed flow values from the running or other average of measured frequency values when tha difference signal varies outside of those limits. Together, these steps assure the generation of relatively steady flow data without sacrificing a direct link to measured values.

In implementing the method of the invention, the apparatus of the invention includes a signal conditioning circuit for preprocessing the vortex sensor signal to enhance the resolvability of its period without distorting the flow data encoded therein. The apparatus of the invention also includes a high resolution period sampling circuit for accurately generating a vortex period signal having a succession of values each of which is indicative of the duration of a respective period (or cycle) of the vortex signal. Finally, the apparatus of the invention includes a control or processing circuit for generating an average period (or frequency) signal having a succession of values, each of which is dependent on the running average of the then current and predetermined immediately preceeding periods of the vortex signal, and then using either the current measured period or the current running average period of the vortex signal, depending upon whether the above mentioned frequency difference signal is within predetermined acceptable limits. The control or processing circuit also performs comparisons between the above-mentioned maximum and minimum acceptable frequency values and generates appropriate out-of-limits messages when either of these values are exceeded.

In the preferred embodiment, the signal conditioning circuit is designed to provide the unprocessed vortex signal with a gain which is a function of the amplitude thereof. This function is preferably selected so that the vortex signal is converted to a form in which it has a substantially constant peak amplitude. This conversion significantly enhances the accuracy with which the period (or frequency) may be measured by subsequent circuitry. Also included in the preferrred embodiment of the signal conditioning circuit is a squaring circuit which effectively converts the originally analog vortex signal into a digital signal, thereby further enhancing the resolution with which its period (or frequency) may be measured.

In the preferred embodiment, the period (or frequency) sampling circuit comprises a counter which is designed to count the number of constant frequency clock pulses which occur during each cycle of the vortex signal. In order to assure high resolution and the resultant reduction of the errors inherent in the use of digital or quantized signals to represent continuous analog variables such as flow, the frequency of this clock signal is chosen to be substantially higher than the highest frequency of the vortex signal and the capacity of the counter is chosen to be correspondingly high. In accordance with a secondary feature of the present invention, this high capacity is divided between a low capacity hardware counter external to the control circuit and a higher capacity counter internal thereto, thereby eliminating the need for an expensive high capacity hardware counter.

In the preferred embodiment, the main control or processing circuit comprises a microcomputer which is programmed to repeatedly input data indicative of the period of the vortex signal, to repeatedly compute the value of the average frequency signal and the frequency difference signal, and use the latter to determine which of the current measured and current average frequencies will be used in determining flow rate and total flow and in expressing the result in the desired system of units. The microcomputer is also programmed to use the above mentioned maximum and minimum acceptable period (or frequency) values to determine the need for and to output appropriate high and low out-of-limits messages. Finally, the microcomputer is programmed to control the operation of output support units, such as a 4-20 ma transmitter, to provide flow data to remote control or logging devices.

In another embodiment, the method and apparatus of the invention does not generate a frequency difference signal. In embodiments of this type, displayed flow values are based solely on the running average of measured frequency values. Because such embodiments make only indirect use of current measured frequency values, they do not constitute preferred embodiments of the present invention.

DESCRIPTION OF THE DRAWINGS

Other objects and advantages of the method and apparatus of the invention will be apparent from the following description and drawings in which.

DESCRIPTION OF THE PREFERRED EMBODIMENT

Figure 1:
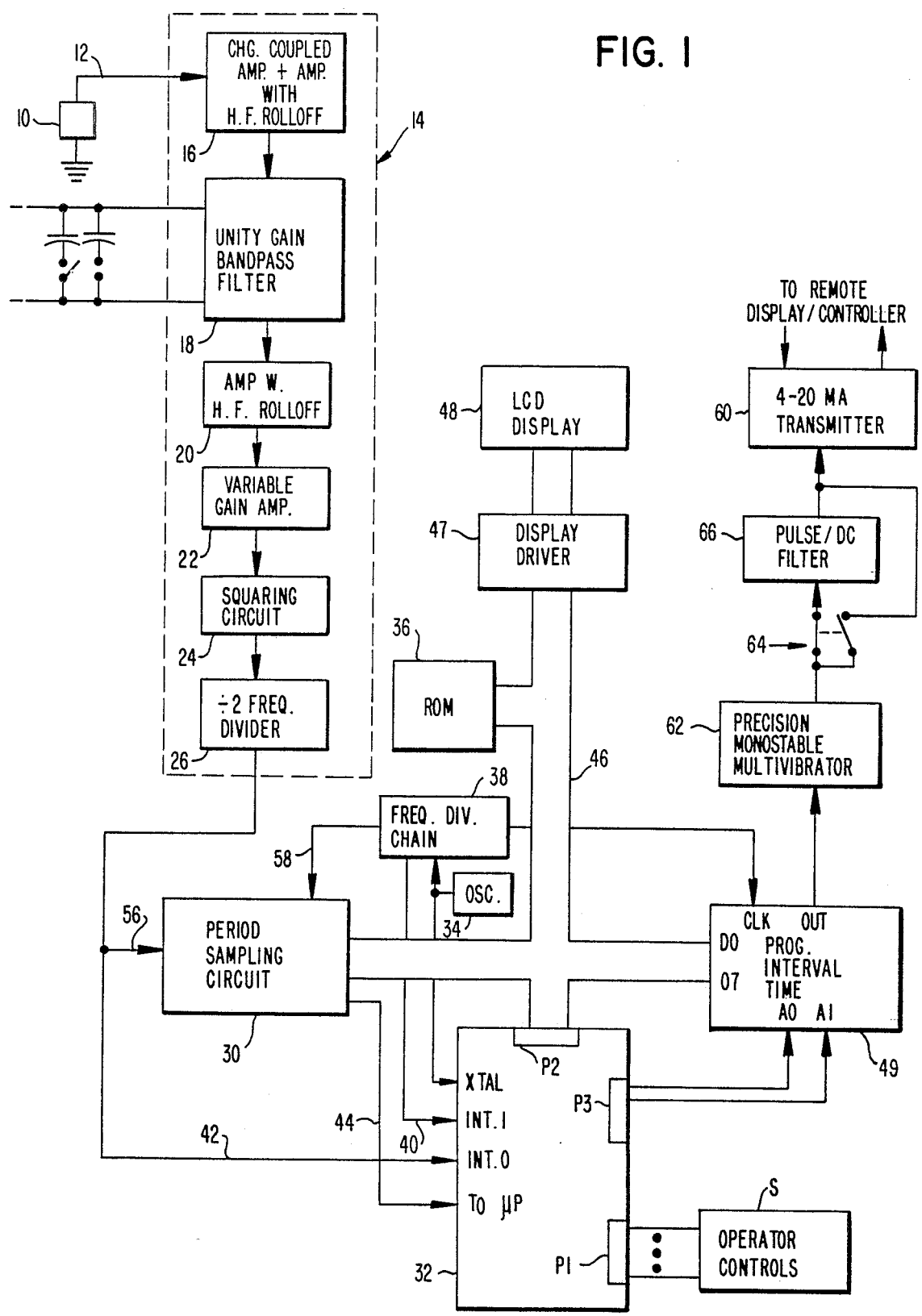
FIG. 1 is a block diagram of one embodiment of an apparatus constructed in accordance with the present invention.

Referring to FIG. 1, there is shown a block diagram of the preferred embodiment of the flowmeter of the invention. This flowmeter includes a vortex sensor 10 which is adapted to be mounted within a pipe (not shown) downstream of a suitable bluff body (not shown) in order to sense the pressure fluctuations produced by vortices shed from that body. Vortex sensor 10 may be of a conventional type and is preferably but not necessarily a piezoelectric sensor. In operation, sensor 10 applies to its output 12 an analog vortex signal having a period that varies in accordance with the rate of flow of a fluid, gas or liquid, and that has an amplitude that varies substantially in accordance with the square of that rate of flow. Because vortex sensors and their operation are well known to those skilled in the art, they will not be further described herein.

To the end that the unprocessed variable amplitude vortex signal on output 12 may be processed into a signal from which the period of the vortex street may be determined with high accuracy, the flowmeter of FIG. 1 includes a signal conditioning circuit 14. As will be explained more fully presently, conditioning circuit 14 serves to provide the unprocessed vortex signal with a gain which is a function of the amplitude and frequency thereof and thereby produce an analog vortex signal which has a substantially constant peak value. Conditioning circuit 14 also serves to square up the resulting analog vortex signal waveform and thereby produce a digital vortex signal having a period that accurately reflects that sensed by sensor 10.

For the sake of clarity, the phrase "vortex signal" will be used herein to refer to the digital vortex signal produced by circuit 14, except where noted. In addition, to avoid repetition, the word "period" will be used interchangeably with the work "frequency", where permitted by its context, and statements framed in terms of one of these will be understood to be equivalent to statements framed in terms of the other. The phrase "period sampling circuit", for example, should be understood to mean a sampling circuit which samples period or, equivalently, a sampling circuit which samples frequency.

In the embodiment of FIG. 1, signal conditioning circuit 14 includes amplifiers 16, 18 and 20, each of which provides a gain that is dependent on signal frequency, a variable gain amplifier 22 which provides a gain that is dependent on signal amplitude, a squaring circuit 24 and an optional divide-by-two frequency divider circuit 26. Among frequency dependent amplifiers 16-20, amplifier 16 includes a charge coupled interfacing amplifier having an input connected to sensor 10 and a fixed gain amplifier which has a high frequency rolloff characteristic that greatly attenuates frequencies above the highest frequency to be sensed by sensor 10. This attenuation serves to eliminate the possibility that circuit 14 will be affected by the tendency of sensor 10 to resonate at high frequencies.

Amplifier 18 comprises a unity gain band-pass filter, the characteristics of which may be modified by the user via a bank of selectable capacitors 19. In operation amplifier 18 is used to provide a gain which decreases as the frequency of the vortex signal increases from its minimum acceptable value $F_{MIN}$ to its maximum acceptable value $F_{MAX}$. This portion of the band-pass characteristic helps to reduce the rate at which the magnitude of the vortex signal increases as a function of frequency. Amplifier 18 is also used to provide a gain which decreases as the frequency of the vortex signal decreases from its minimum acceptable value $F_{MIN}$ toward zero frequency. This portion of the band-pass characteristic helps to attenuate low frequency noise, commonly referred to as "pipe noise." It will therefore be seen that band-pass filter 18 has a center frequency which preferably coincides with minimum frequency $F_{MIN}$ and a gain that decreases as the frequency of the vortex signal increases from minimum frequency $F_{MIN}$ toward maximum frequency $F_{MAX}$, i.e., across the frequency band within which the flowmeter provides its most accurate readings. Ordinarily, this band of interest will be selected so that it coincides with the flat portion of the curve of Strouhal number vs. Reynolds number which is characteristic of the fluid being measured and the pipe in which its flows.

Amplifier 20 also comprises an amplifier having a gain that decreases as the frequency of the vortex signal increases. This amplifier is provided in order to offset any remaining tendency for the magnitude of the output signal of band-pass filter 18 to increase as a function of frequency. In other words, amplifier 20 serves to supplement the frequency dependent attenuation provided by band pass filter 18. Naturally, if the latter filter has sufficient high frequency rolloff, it would not require such supplementary attenuation. In such a case, amplifier 20 may be eliminated.

Variable gain amplifier 22 serves to provide a gain which is highest for low magnitude vortex signals and which decreases as the magnitude of the vortex signal increases. The effect of this magnitude dependent gain is to produce a vortex signal which has approximately constant peak value. In other words, variable gain amplifier 22 serves to provide an automatic gain control function. One well-known type of amplifier which may be used to produce this effect is an amplifier having a pair of resistors and a pair of back to back diodes connected in its negative feedback path. It will be understood that the illustrated division of functions among circuits 16–22 is only one of a number of possible divisions, and that it is possible to perform these functions by means of appropriate multi-function circuits, e.g. a circuit which combines the functions of circuits 20 and 22.

The above-described analog vortex signal is converted to a digital vortex signal by a suitable squaring circuit 24. In the preferred embodiment, this squaring circuit comprises a comparator having a threshold voltage which is selected so that its output switches from one digital state to another at the zero crossings of the analog vortex signal. The frequency of the resulting digital vortex signal may then be divided by two by divide-by-two frequency divider 26. This frequency division is often desirable because it further increases the resolution with which the period of the vortex signal may be measured. It should be noted that this frequency division does not result in a distortion of the measured data because it can be taken into account in the course of the later processing of the vortex signal.

Because the values of the components used in the above described circuits are dependent upon many factors such as the viscosity of the fluid to be measured, the size of the pipe and the size and geometry of the bluff body and vortex sensor, it is not possible to discuss the same in general terms. In addition, the structures of circuits capable of meeting the above described criteria are well known to those skilled in the art. As a result, neither these circuits nor the values of the components used therein will be discussed in detail herein.

In view of the foregoing, it will be seen that the output signal of signal conditioning circuit 14 is a digital vortex signal which has a substantially constant amplitude and a period that is determined by the period of the analog output signal of vortex sensor 10.

Figure 2:
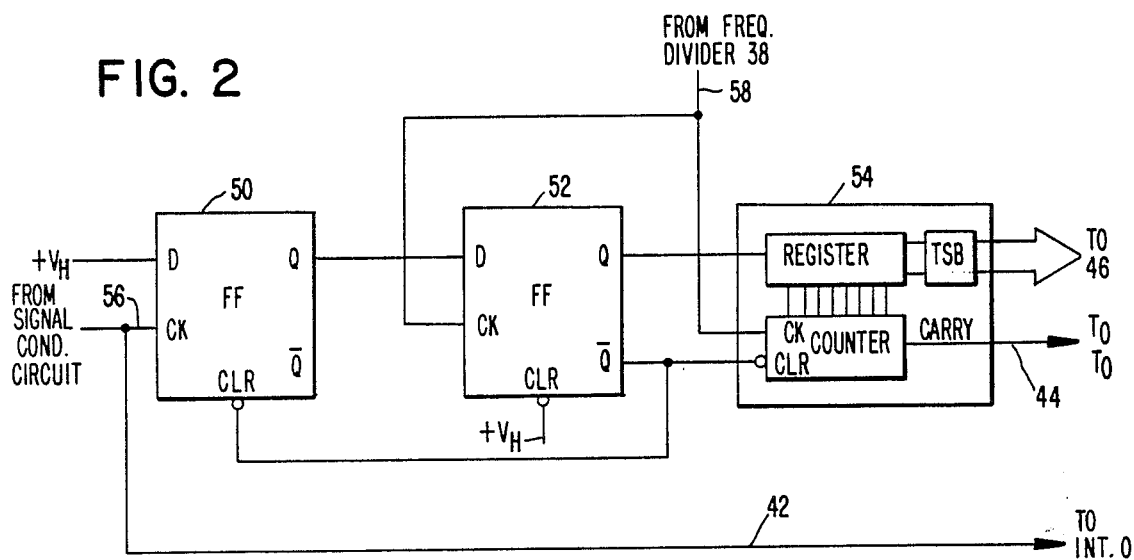
FIG. 2 is a fragmentary schematic diagram of the period sampling circuitry of FIG. 1.

To the end that the period of the vortex signal may be measured with a high degree of accuracy, the embodiment of FIG. 1 includes a period sampling or capture circuit 30, the internal circuitry of which is shown in FIG. 2. As will be explained more fully presently, sampling circuit 30 includes a high resolution counter which operates in conjunction with a control element, preferably a programmed microcomputer and a source of high frequency (e.g. 2 MHz) clock pulses to count the number of clock pulses which occur between successive pairs of positive or rising transitions of the vortex signal. The result of this counting process is a vortex period signal having a succession of values, each of which is indicative of the duration of a respective one of the periods of the vortex signal.

In the embodiment of FIG. 1, the microcomputer includes an 8-bit CHMOS central processor chip 32 of the type sold by Intel Corporation under the model designation 80C31, together with a crystal oscillator 34 and a suitable read only memory (ROM) 36 for storing the invariant portions of the operating program. Variable portions of the operating program such as current and predetermined prior values of measured vortex signal periods may be stored in the 128×8 bit random access memory (RAM) which is included on processor chip 32. This memory architecture is not essential to the present invention, however, and it will be understood that the term "memory" as used herein refers to any single or multi-part memories, whether RAM or ROM, which are within the address space of processor 32.

Among the inputs and outputs of processor 32 that are used in practicing the present invention are an input XTAL which receives a high frequency (1 MHz) clock signal from crystal oscillator 34; this clock signal controls the internal timing of processor functions. Also included among these inputs are negative or falling edge responsive interrupt inputs INT.0 and INT.1, which are used to control the period sampling and totalizing functions, respectively, and a timer input $T_o$. A still further input includes an 8 bit I/O port P1 that is connected to a set of external switches S which are used by the operator of the flowmeter to enter application dependent variables such as the units in which the flow rate and total flow are to be displayed. Processor 32 also includes an 8 bit I/O, port P2 through which it can input or output information from or to an external data bus 46 that is connected to period sampling circuit 30, ROM 36, a programmable interval timer 49, and the driver circuit 47 of an LCD display 48. Finally, processor 32 includes an I/O port P3 through which it outputs signals that set the operating mode of programmable timer 49, select among external chips, etc. The functions of these inputs and outputs will be described later in connection with the devices to which they are connected.

In the embodiment of FIG. 1, the clock signal frequencies used to clock the various circuit elements or to otherwise control the timing of their operation are derived from crystal oscillator 34 by means of a frequency changer circuit 38 which includes one or more frequency multiplying and/or dividing networks. Circuit 38 may, for example, include a frequency multiplying network which produces the 2 MHz clock signal used by sampling circuit 30 from the MHz output signal of oscillator 34. Similarly, circuit 38 may include a multi-stage frequency divider network to derive the 1 Hz interrupt signal used by the INT.1 input of processor 32 from the output signal of oscillator 34. Because the circuitry of such networks is well known to those skilled in the art, that circuitry will not be described in detail herein.

In accordance with a secondary feature of the present invention, the desired high resolution measurement of the period of the vortex signal is achieved, without using a high capacity hardware counter within sampling circuit 30, by effectively locating a part of the counter within processor 32. If, for example, the total capacity of the counter is to be 24 bits, the least significant 8 bits may be counted by an 8 bit hardware counter 54 located within sampling circuit 30, while the most significant 16 bits are counted by registers located within processor 32. The necessary coordination between these two parts of the counter is assured by connecting the carry output of the hardware counter to the $T_O$ (timing) input of processor 32, via a conductor 44, and by including appropriate register read instructions in the operating program of processor 32. When the entire 24 bit count is to be read, processor 32 assembles the same by reading the 8 least significant bits of the count from sampling circuit 30, via bus 46, and reading the remaining 16 bits from its internal registers.

The coordinated operation of the internal and external portions of the counters is assured by applying the vortex signal to the INT.0 interrupt input of processor 32 via a conductor 42. Upon the occurrence of each negative transition of the vortex signal on conductor 42, processor 32 is programmed to prepare for the initiation of a cycle of counting activity by the internal portion of the counter. Later, upon the occurrence of the next positive transition of the vortex signal, the internal counters are cleared and permitted to begin counting carry pulses received from the external portion of the counter via input $T_o$. The same transition, applied via conductor 56, also initiates a fresh cycle of counting activity by the external portion of the counter. As a result, at the conclusion of each cycle of counting activity, the contents of the two portions of the counter reflects the total number of clock pulses which have occurred between successive pairs of positive transitions of the vortex signal and consequently, the duration of the period of that signal.

The operation of period sampling circuit 30 will now be described with reference to FIG. 2. In the embodiment of FIG. 2, sampling circuit 30 includes two D-type filp-flops 50 and 52 and an integrated circuit 54 including a counter, an output register and tri-state buffer, which circuit may be of the type sold by Texas Instruments under the model designation TI 74590.

The operation of the circuit of FIG. 2 may be summarized as follows. Upon the occurrence of a positive transition in the vortex signal on conductor 56, the continuous 1 state signal $+V_H$ at the D input of flip-flop 50 is transferred to the Q output thereof and applied to the D input of flip-flop 52. Later, upon the occurrence of the next positive transition of the clock signal on conductor 56, this 1 state signal is transferred to the Q output of flip-flop 52 and a 0 state signal is transferred to the Q output thereof. As this occurs, the 1 state signal at the Q output of flip-flop 52 causes the contents of the counter to be latched into the output register, thereby making available to processor 32 the result of the last counting cycle. At approximately the same time, the 0 state signal at the Q output of flip-flop 52 clears the counter, to prepare it for a new cycle of counting activity, and resets flip-flop 50. Thereafter, with the next positive transition of the clock signal, flip-flop 52 is reset by the 0 state Q output of now reset flip-flop 50. After this occurs, the counter continues to count and to output carry pulses to processor 32 until the next positive transition of the vortex signal causes the just described sequence of events to be repeated.

In view of the foregoing, it will be seen that successive pairs of positive transitions of the vortex signal cause successive 24 bit counts, collectively referred to herein as the vortex period signal, to be made available to processor 32. It will also be seen that, because of the design of sampling circuit 30, this count is made available to processor 32 with minimal involvement by that processor.

Figure 3A:
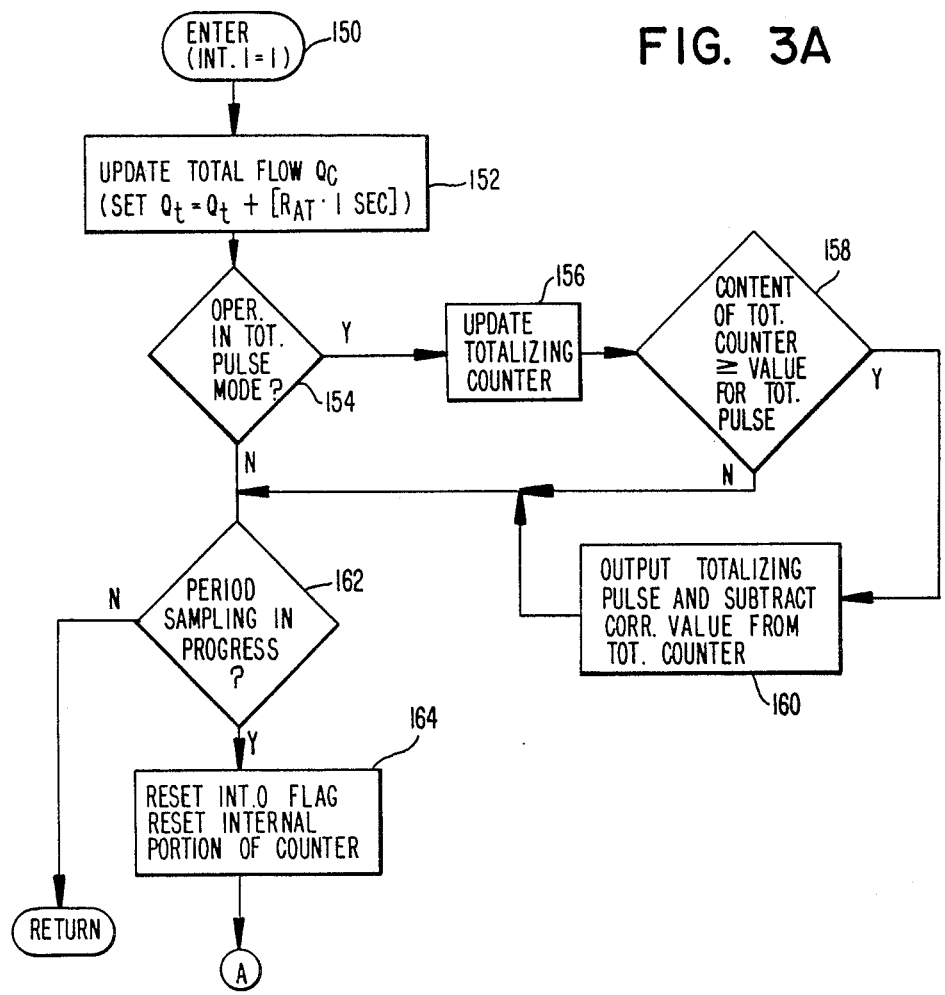
FIG. 3A shows the flow chart of a totalizing subroutine which may be used with the flow chart of FIG. 3.
Figure 3:
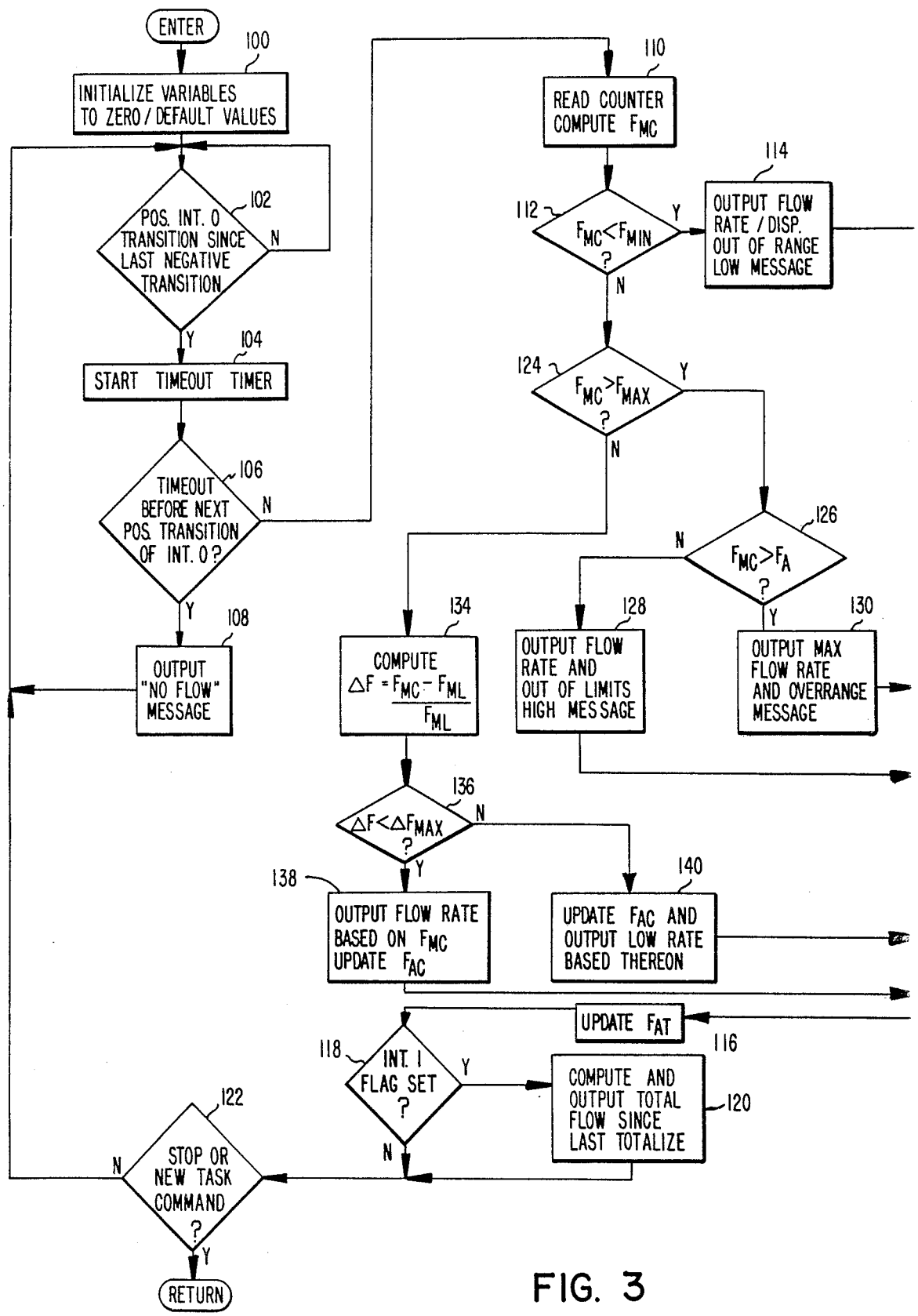
FIG. 3 shows one example of a flow chart which illustrates the method of the present invention and the program used by the circuit of FIG. 1.

The manner in which the method and apparatus of the invention uses the vortex period signal and interrupt signals INT.0 and INT.1 to determine the rate of flow and total flow of the fluid to be measured is most easily understood with reference to the flow chart of FIG. 3. For the sake of clarity, this flow chart uses certain symbols to represent the variables. Definitions of these symbols are set out in the following Table 1:

TABLE 1

| | |
|---|---|
| $F_{MIN}$ | The minimum acceptable frequency of the vortex signal, i.e., the lower limit of the frequency range within which flow measurements are most accurate. |
| $F_{MAX}$ | The maximum acceptable frequency of the vortex signal, i.e., the upper limit of the frequency range within which flow measurements are most accurate. |
| $F_A$ | The vortex frequency which is associated with the absolute maximum output current of 4–20 ma transmitter 60. |
| $F_{MC}$ | The current (most recently) measured frequency of the vortex signal. |
| $F_{ML}$ | The last measured frequency of the vortex signal, i.e.. the frequency measured immediately prior to frequency $F_{MC}$. |
| $F_{AC}$ | The currently (most recently) computed value of the running average frequency of the vortex signal. |
| $F_{ML}$ | The value of the running average frequency of the vortex signal computed immediately prior to frequency $F_{AC}$. |
| $R_{AT}$ | The average rate of flow of the fluid during the period between successive flow totalizations. |
| $\Delta F_{MAX}$ | A user selected number representing the maximum frequency difference or maximum percentage frequency difference at which $F_{MC}$ rather than $F_{AC}$ is used to determine the flowmeter output. |
| $Q_C$ | The current value of totalized flow, i.e., the total quantity of fluid which has flow since a selected point in time. |
| $Q_L$ | The value of totalized flow which immediately preceeded the current value thereof. |

Because the instructions used to receive and process user entered constants, such as those which specify the system of units in which flow values are to be displayed, the values of $F_{MIN}$, $F_{MAX}$, $F_A$, etc., are not directly related to the present invention and are of types well known to those skilled in the art, blocks corresponding to these instructions have not been included in FIG. 3.

Referring to FIG. 3, operation in accordance with the invention begins when the processor encounters block 100. This block, which is effective primarily at start up, causes the processor to determine whether the variables to be used have been once initialized. If they have not been once initialized, the processor proceeds to block 100, which causes it to initialize these variables to either zero or default values. The initialization of some variables such as $F_{MC}$, $F_{AC}$ to zero is desirable because it assures that the system begins in a properly zeroed condition. The initialization of other variables such as $F_{ML}$ to non-zero or default values is desirable to prevent divisions by zero (see block 134) or other difficulties which could occur if the program were to begin with them at a value of zero. Frequency $F_{ML}$, for example, may be initialized to a value of 1. If the variables have been once initialized, block 101 is bypassed.

Once the processor has taken the action indicated by block 100, or bypassed that block, it encounters a block 102, which causes it to reset an INT.0 flag that is associated with processor interrupt INT.0. This assures that the processor is conditioned to detect the next positive transition of the vortex signal, an event which is taken as the beginning of a new period of the vortex signal. The processor is then directed to a block 104, which causes it to wait until the occurrence of the next positive transition of the vortex signal sets the INT.0 flag and thereby allows it to proceed to block 106. When the latter event occurs, the processor knows that a new period measuring cycle is in progress.

Upon encountering block 105, the processor is directed to start a software time-out timer having a period (such as 1 second) long enough to accommodate the long vortex signal periods that are associated with very low flow rates. After exiting block 104, the processor proceeds to block 106, which causes it to determine whether the timer has timed out before the next positive transition at input INT.0. If it has, the processor knows that a substantially zero flow condition exists. In such a case, the processor proceeds to a block 108 which causes it to output a "no flow" message on display 48 and return to the input of block 100, via a block 122 which is present in order to allow the processor to be stopped or diverted to a new task. If it has not, the processor knows that a non-zero flow condition exists and proceeds to block 110, which causes it to read the contents of the 24 bit counter and determine therefrom the current measured value $F_{MC}$ of the frequency of the vortex signal.

Upon exiting block 110, the processor proceeds to block 112, which causes it to determine whether $F_{MC}$ is less than minimum acceptable frequency $F_{MIN}$. If it is, the processor knows that the flow rate is so low that the flowmeter is operating below the lower end of the region within which it gives its most accurate readings. In such a case, the processor is directed to a block 114 which causes it to determine and output the rate of flow indicated by $F_{MC}$, but also to display an "out of limits low" message on display 48. (Because equations which allow current flow rate to be computed from current frequency are conventional and well known to those skilled in the art, they will not be presented or discussed herein.) Thereafter, unless directed to stop or proceed to another task by block 122, the processor is directed back to the input of block 100 to begin a new measurement cycle.

If block 112 indicates the current measured frequency is greater than $F_{MIN}$, the processor knows that the flowmeter is operating above the lower end of its most accurate range and proceeds to block 124. The latter block causes the processor to determine whether the current measured frequency exceeds $F_{MAX}$, the frequency which lies at the upper end of the most accurate range of the flowmeter. If it does, the processor is directed to one of blocks 128 and 130, depending upon whether, as determined with block 126, the current measured frequency exceeds $F_A$, the frequency which corresponds to the absolute maximum output current of transmitter 60. If the processor is directed to block 128, it knows that the flowmeter is operating above the upper end of its most accurate range and proceeds to determine and output the rate of flow indicated by $F_{MC}$ along with an "out of limits high" message. The processor then returns to the input of block 100 via block 122. If the processor is directed to block 130, it knows that transmitter 60 is outputting more than its normal maximum output current (20 ma) and outputs a flow rate which corresponds to a value higher than that normal maximum current until transmitter 60 reaches its absolute maximum output (e.g. 24 ma), whereupon the outputted flow rate is held at a value corresponding to that absolute maximum. The processor couples all such supra-normal outputs with the display of an "overrange" message. The processor then returns to block 100 via block 122.

If current measured frequency $F_{MC}$ is within the range defined by $F_{MIN}$ and $F_{MAX}$, i.e., if the processor exits blocks 112 and 124 via the "no" outputs thereof, the processor is directed to a block 134. This block causes the processor to generate $\Delta F$, a frequency difference signal which, in the embodiment of FIG. 3, is indicative of the percentage difference between the frequency $F_{MC}$ of the current period of the vortex signal and the frequency $F_{ML}$ of the immediately proceeding period of the vortex signal. It will be understood that, if desired, the average frequency of two or more immediately preceeding periods of the vortex signal may be used in place of $F_{ML}$. In addition, if desired, division by $F_{ML}$ may be eliminated, in which case $\Delta F$ will be indicative of the absolute frequency difference between $F_{MC}$ and $F_{ML}$ rather than the percentage frequency difference therebetween. All such variations in the method of determination of $\Delta F$ will be understood to be within the contemplation of the present invention.

Upon existing block 134, the processor is directed to a block 136 which causes it to determine if $\Delta F$ is less than $\Delta F_{MAX}$, a user selectable value indicative of the point at which $\Delta F$ is sufficiently large to raise a question as to its validity. If $\Delta F$ is less than $\Delta F_{MAX}$, the processor is directed to a block 138, which causes it to use current measured freuency $F_{MC}$ to determine the current flow rate, output that flow rate, update current average frequency $F_{AC}$, and then return to block 100 via block 122. If $\Delta F$ exceeds $\Delta F_{MAX}$, the processor is directed to a block 140, which causes it to update current average frequency $F_{AC}$, determine the current flow rate therefrom, output that flow rate, and then return to block 100 via block 122. It will therefore be seen that the method and apparatus of the invention contemplate the determination of the current flow rate from the better of two frequency values, both of which are based on directly measured vortex signal frequencies. This in turn assures that the method and apparatus of the invention aford measurements having an accuracy not available from previously known flowmeters.

In computing current average frequency $F_{AC}$, it is possible to use any of a number of different averaging techniques. The average may, for example, be computed by adding each current frequency value to a predetermined number of immediately preceeding frequency values and then dividing by the total number of added values. The average may also be computed by adding the product of the last computed average frequency and a first weighting constant to the product of the current measured frequency and a second weighting constant. If, for example, the average is to include 10 frequency values, it may be computed by adding 9/10 of the last average frequency to 1/10 of the current measured frequency. In the present embodiment, the use of the latter technique is prefered because it requires less time and less memory space. It will be understood that other kinds of averages, such as weighted averages or weighted running averages, may be used and that all such averages are within the contemplation of the invention.

It should be noted that none of the question blocks 112, 124, 126 and 136 of FIG. 3 specify what happens when the variables being compared are equal to one another, i.e., include no "greater than or equal to" or "less than or equal to" symbols. The reason for this omission is not that conditions of equality need not be provided for, but rather that the choice as to whether the condition of equality leads to the "yes" or "no"

output is not a matter of significance to the present invention and may be determined as a matter of design choice, taking into account the needs of the particular application.

If the mass density of the fluid is relatively low and/or if the conditions of flow are such that the flow undergoes rapid short term changes, frequency difference $\Delta F$ will tend to remain relatively high. In such a case, it is feasible to eliminate blocks 134, 136 and 138 and to always compute and output flow rate on the basis of the currently measured average frequency. Such an approach would, however, cause the flowmeter to be less accurate in applications in which the conditions of flow do not undergo rapid short term changes. As a result, flowmeters which use such an approach constitute non-preferred embodiments of the invention.

In the preferred embodiment, the determination of flow rate is accompanied by a substantially simultaneous determination of total flow. This is preferably accomplished by periodically interrupting the operations illustrated in FIG. 3, executing a totalization routine, and returning to those operations. One embodiment of such a totalization routine is shown in FIG. 3A.

Referring to FIG. 3A, the totalization routine is entered, via a block 150, each time that the INT.1 interrupt indicates the passage of the desired totalizing interval. This interval, which preferably has a duration of 1 second, is set by the circuitry of frequency changer circuit 38 of FIG. 1. After entering via block 150, the processor is directed to a block 152 which causes it to update the current value of the total flow $Q_C$, based on the last value thereof $Q_L$ and the average rate of flow $R_{AT}$ since the last totalization, the latter rate of flow being in turn dependent on the average frequency of the vortex signal since the last totalization. If the number of periods sampled during the totalizing interval is sufficiently small, flow rate $R_{AT}$ may be computed directly from $F_{AC}$, thereby eliminating the need to make a separate computation of the average value of the vortex signal frequency over the totalizing interval.

After the total flow is updated, the processor is directed to a block 154 which causes it to determine whether the flowmeter has been directed by its user to operate in a "totalizing pulse mode." If it has, the processor knows that it is to output a totalizing pulse (e.g. on output conductor 45) each time that a user selected unit of volume such as 100 gallons has flowed past sensor 10. In such a case, the processor is directed to a block 156 which causes it to update an internal totalizing counter which is set aside for this purpose. Thereafter, the processor proceeds to a block 158, which causes it to determine if the contents of the totalizing counter are large enough to indicate that a totalizing pulse should be outputted. If they are, the processor is directed to block 160, which causes it to output that pulse and subtract the corresponding value from the counter. If they are not, no such pulse is outputted and the processor is directed to the next block 162. The processor is also directed to block 162, via the "no" branch of block 154, if the flowmeter is not operating in the totalizing pulse mode.

In block 162, the processor is directed to determine if the period sampling process is currently in progress. If it is, the processor is directed to a block 164, which causes it to reset the INT.0 flag and the internal portion of the period sampling counter and then return to block 104 of the flow chart of FIG. 3 via connector A to begin a fresh sampling cycle. If it is not, the processor is directed to return to the flow chart at the point at which it left to continue its operation from that point. Together, these blocks assure that the processor does not use incomplete period data as a result of its execution of the totalization subroutine.

The manner in which the preferred embodiment of the invention outputs flow data determined in the above-described manner will now be discussed with reference to FIG. 1. In the embodiment of FIG. 1, there is included both a local and a remote output capability. The local portion of this output capability results from the mounting of LCD display 48 on the housing of the flowmeter (not shown). In operation, this display preferably displays current flow rate and total flow, on an alternating basis. Because the instructions necessary to produce such an alternating display are of a type well know to those skilled in the art, they will not be discussed in detail herein.

The remote portion of the output capability of the invention preferably results from the inclusion in the circuit of FIG. 1 of programmable interval timer 49, which may be of the type sold by Intel Corporation under the model designation 82C54. This timer includes an 8-bit data input D0–D7 which is connected to bus 46 of processor 32, a two bit mode control input A0 and A1 which is connected to I/O port P3 of processor 32, a clock input CLK which is connected to oscillator 34 and an output OUT (one of three) which is connected to signal processing circuitry to be described more fully presently.

In the preferred embodiments, mode control inputs A0–A1 of timer 49 are used to specify operation in its mode 2, i.e. as a rate generator. This means that timer 49, when loaded with a number indicative of the rate of flow via bus 46 and clocked by oscillator 34, serves to generate at output OUT thereof a pulse train having a frequency which is proportional to that rate of flow. The generation of this pulse train will continue, without further intervention by processor 32, until the latter outputs a new number. Since, however, such a new number is outputted relatively frequently by processor 32, as explained in connection with FIG. 3, the frequency of the output pulse train of timer 49 will also change relatively frequently. During operation, the chip select inputs CS of timer 49 and display driver 47 are used to assure that the timer is not affected by the outputting of data to display driver 47 and vice versa.

To the end that the information encoded in the frequency of the output of timer 49 may be converted to a form which is suitable for driving 4–20 ma transmitter 60, the circuit of FIG. 1 includes a precision monostable multivibrator 62, a digital/analog selector switch 64 and a pulse-to-DC filter 66. Of these, multivibrator 62 serves to assure that the output pulse train of timer 49 is converted to a pulse train having an average DC value proportional to the frequency of the output pulse train of timer 49. When selector switch 64 is in the position shown in FIG. 1, pulse-to-DC filter 66 generates a DC signal proportional to that average DC value, causing 4–20 ma transmitter 60 to output a 4–20 ma encoded analog signal suitable for connection to a remotely located analog flow controller or display. When selector switch 64 is in a state opposite to that shown in FIG. 1, filter 66 is bypassed, causing 4–20 ma transmitter 60 to output a 4–20 ma encoded digital signal suitable for connection to a remotely located digital flow controller or display. Because the structure and operation of circuits suitable for use as circuits 60–66 are well known to those skilled in the art, they will not be discussed in detail herein.

It wil be understood that, if the invention is to be used with a remotely located totalizer, totalizing pulses suitable for use in controlling the same may be generated in generally the same manner as the signals described in connection with circuits 49 and 62–66. Totalizing pulses may also be generated by using one of the unused bits of one of the I/O ports of processor 32, such as the bit connected to conductor 45.

Although the method and apparatus of the invention has been discussed with reference to certain specific embodiments, the true spirit and scope of the invention should be determined with reference to the following claims.

What is claimed is:

1. In a flowmeter having an input connected to a vortex sensor producing an analog vortex signal and having an output providing an output signal that varies in accordance with the rate of flow of a fluid past said sensor, in combination:
   (a) signal conditioning means adapted to be connected to the vortex sensor for converting said analog vortex signal to a digital vortex signal having a period that varies in accordance with said rate of flow;
   (b) period sampling means responsive to the digital vortex signal for generating a vortex period signal having a succession of values each of which is indicative of the duration of a respective one of the period of the digital vortex signal;
   (c) control means connected to the period sampling means for:
      (i) generating an average frequency signal having a succession of values each of which is dependent on the average of the frequencies indicated by the then current and predetermined immediately preceding values of the vortex period signal;
      (ii) generating a frequency difference signal having a succession of values each of which is dependent upon the difference between the frequencies indicated by the then current and predetermined immediately preceding values of the vortex period signal;
      (iii) generating said output signal from the then current value of the vortex period signal, if the then current value of the frequency difference signal is less than a predetermined value; and
      (iv) generating said output signal from the then current value of the average frequency signal, if the then current value of the frequency difference signal exceeds said predetermined value.

2. The flowmeter of claim 1, in which the control means also serves as means for storing a frequency value indicative of the maximum acceptable frequency the digital vortex signal, and means for signalling the existence of an excessive flow condition when the frequency of the digital vortex signal exceeds said frequency of the digital vortex signal exceeds said frequency value.

3. The flowmeter of claim 1, in which the control means also serves as means for storing a frequency value indicative of the minimum acceptable frequency of the vortex signal, and means for signalling the existence of an insufficient flow condition when the frequency of the vortex signal falls below said frequency value.

4. The flowmeter of claim 1 in which the control means also serves as means for periodically determining total flow and for outputting a signal indicative of that flow.

5. The flowmeter of claim 1 in which the frequency difference signal is expressed as a percentage of the frequency indicated by at least one of the immediately preceding periods of the digital vortex signal.

6. The flowmeter of claim 1 in which the current value of the average frequency signal is calculated from the immediately preceding value of the average frequency signal and the current frequency of the digital vortex signal.

7. The flowmeter of claim 1 in which the period sampling means includes:
   (a) an oscillator for generating a clock pulse train having a frequency which is subsantially higher than that of the digital vortex signal;
   (b) a counter for counting the number of clock pulses produced by the oscillator during successive periods of the digital vortex signal; and
   (c) said control means being arranged to input the contents of the counter at the end of successive periods of the digital vortex signal.

8. The flowmeter of claim 7 in which the counter includes a first section external to the control means, a second section internal to the control means, and means for coordinating the operation of said first and second sections so that they provide a combined count indictive of the current period of the digital vortex signal.

9. The flowmeter of claim 1 in which the control means comprises a programmed control element having an output port, and in which the control means generates said output signal by outputting to said port a succession of numerical values having magnitudes proportional to said rate of flow.

10. The flowmeter of claim 9 further including a programmable interval timer having an input for receiving said numerical values and an output for supplying a pulse train having a frequency which varies in accordance with the magnitudes of those numerical values, means for connecting the input of the timer to said output port and means for connecting the output of the timer to the output of the flowmeter.

11. The flowmeter of claim 1 in which the signal conditioning means includes automatic gain control means for causing the analog vortex signal to have a substantially constant peak amplitude.

12. The flowmeter of claim 1 in which the control means comprises a programmed microcomputer, said microcomputer including a memory for storing frequency data for periods of the digital vortex signal prior to the current period thereof and for storing instructions for generating said average frequency signal, said frequency difference signal, and said output signal.

13. A method for measuring flow in a flowmeter of the type including a vortex sensor producing an analog vortex signal, a signal conditioning circuit for converting said analog vortex signal to a digital vortex signal having a period that varies in accordance with the rate of flow of a fluid past the vortex sensor, and an output, including the steps of:
   (a) generating from said digital vortex signal a vortex period signal having a succession of values each indicative of the duration of a respective period of the digital vortex signal;
   (b) generating an average frequency signal having a succession of values each dependent upon the average of the frequencies indicated by the then current and predetermined prior periods of the digital vortex signal;

(c) generating a frequency difference signal having a succession of values each dependent upon the difference between the frequencies indicated by the then current and predetermined prior periods of the digital vortex signal;

(d) generating and applying to the output an output signal having a magnitude dependent upon the then current frequency of the digital vortex signal, if the then current value of the frequency difference signal is less than a predetermined value; and (e) generating and applying to the output an output signal having a magnitude dependent upon the then current value of the average frequency signal, if the then current value of the frequency difference signal exceeds said predetermined value.

14. The method of claim 13 further including the steps of:
(a) storing a frequency value indicative of the maximum acceptable frequency of the digital vortex signal;
(b) comparing the frequency indicated by the period of the digital vortex signal to said frequency value; and
(c) generating an excessive flow message if the frequency of the digital vortex signal exceeds said frequency value.

15. The method of claim 13 further including the steps of:
(a) storing a frequency value indicative of the minimum acceptable frequency of the digital vortex signal;
(b) comparing the frequency indicated by the period of the digital vortex signal to said frequency value; and
(c) generating an insufficient flow message if the frequency of the digital vortex signal falls below said frequency value.

16. The method of claim 13 further including the steps of:
(a) determining the total quantity of fluid which flows past said sensor during each of a succession of totalizing intervals;
(b) using said total quantity to determine the total quantity of fluid which has flowed past said sensor since a predetermined point in time; and
(c) outputting a signal indicative of said total quantity of flow since said predetermined point in time.

17. The method of claim 13 wherein the current value of the frequency difference signal is generated from the immediately prior value of the frequency difference signal and the current frequency of the digital vortex signal.

18. The method of claim 13 further including the step of providing the analog vortex signal received from the vortex sensor with a gain that varies inversely in accordance with the magnitude thereof and thereby producing an approximately constant peak amplitude analog vortex signal.

19. The method of claim 13 in which step (a) includes the steps of:
(a) generating a clock pulse train having a frequency substantially higher than that of the digital vortex signal; and
(b) counting the number of clock pulses which occur during successive periods of the digital vortex signal.

* * * * *